Figure 1:
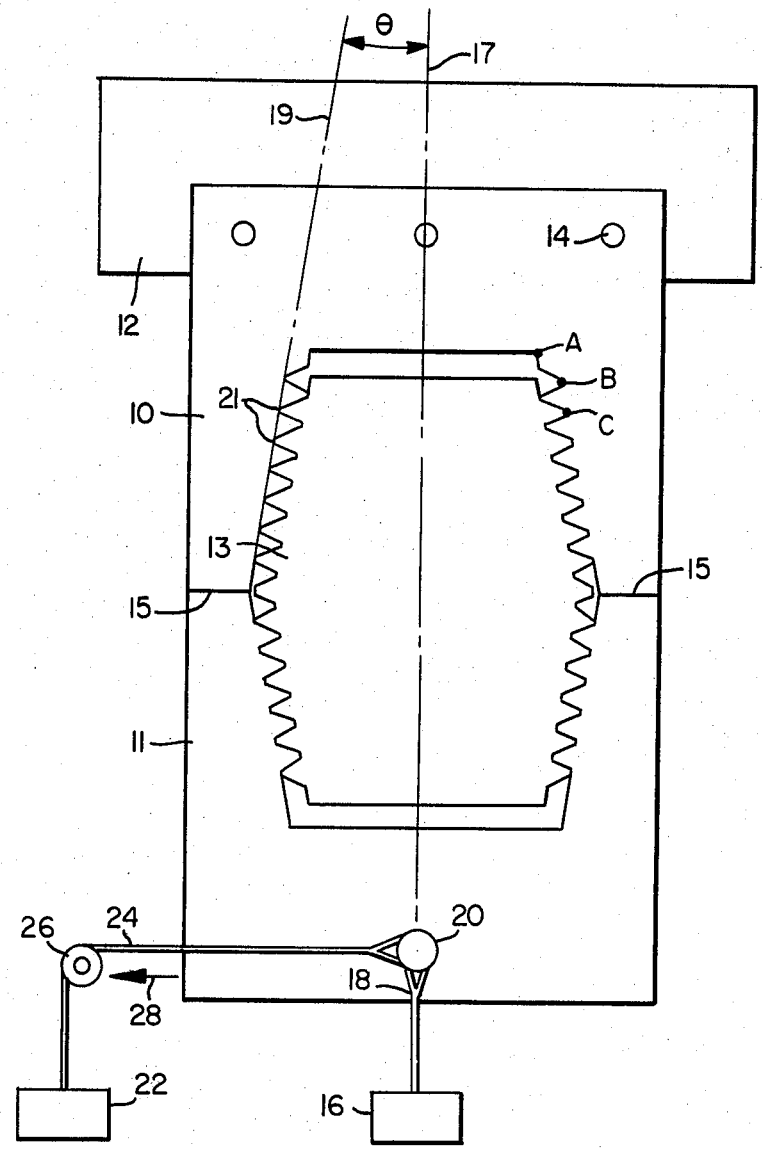

United States Patent [19]

Seldin et al.

[11] 4,290,709

[45] Sep. 22, 1981

[54] HIGH TAPER ANGLE CONNECTING PIN FOR GRAPHITE ELECTRODE JOINTS

[75] Inventors: Emanuel J. Seldin, Middleburg Heights, Ohio; Tu-Lung Weng, San Jose, Calif.

[73] Assignee: Union Carbide Corporation, New York, N.Y.

[21] Appl. No.: 79,887

[22] Filed: Sep. 28, 1979

[51] Int. Cl.³ .......................... F16B 7/18; H05B 7/06
[52] U.S. Cl. ............................ 403/296; 403/DIG. 5; 13/18 C; 339/263 E
[58] Field of Search ................. 403/296, DIG. 5, 267; 13/18 C, 18 R; 339/263 E

[56] References Cited

U.S. PATENT DOCUMENTS 3,419,296  12/1968  Cook ..................... 403/296 X
4,152,533  5/1979  Gazda ................... 403/DIG. 5

FOREIGN PATENT DOCUMENTS 1231044  5/1971  United Kingdom ............ 339/263 E

Primary Examiner—James Kee Chi
Attorney, Agent, or Firm—J. Hart Evans

[57] ABSTRACT

In graphite electrode joints comprising two graphite electrode ends having axial tapered end sockets and a double ended tapered thread connecting pin screwed into both of said sockets, the strength of the joint is improved by increasing the angle of the taper from the conventional 9.46 degrees to from 15 to 35 degrees.

8 Claims, 4 Drawing Figures

HIGH TAPER ANGLE CONNECTING PIN FOR GRAPHITE ELECTRODE JOINTS

Graphite electrodes of the type used in steel furnaces are made in diameters of from four inches up to as large as twenty-eight inches. They are commonly made and shipped in uniform lengths and then joined together at the point of use. This joining of electrode sections is commonly accomplished using threaded connecting pins which are screwed into threaded holes or sockets in the electrode ends. Originally these connecting pins were cylindrical with straight threads. Many years ago, however, it was discovered that a tapered threaded pin was faster to use and gave a stronger joint than an equivalent straight pin.

At the time the tapered joint was adopted by electrode manufacturers a taper of four inches of diameter per foot of pin length was selected. This was apparently done because it was the steepest taper which could be conveniently made on the equipment when available and because no advantage was seen for a greater taper. This taper of four inches of diameter per foot of pin length, which is a taper of 9.46 degrees from the centerline of the pin, has become the standard for the industry and is used in all pin connected graphite electrodes produced commercially today.

In addition to the functional consumption of graphite electrodes in steel furnaces there are breakage losses and intensified surface oxidation losses in the joint regions. The breakage losses are due to external mechanical loads, such as bending movements caused by shifting steel scrap striking the bottom of the electrode column. These bending movements can cause breakage at the highest joint in the column below the electrode holder. Losses at the surface of the electrodes due to oxidation are more severe in the joint region where the joint electrical resistance causes the electrode surface temperature to increase.

It is an object of the present invention to improve the mechanical strength and resistance to breakage from bending of electrode columns employing tapered threaded connecting pins to join electrode sections. A further object of the invention is to provide joints of this type with lowered electrical resistance.

It has now been discovered that these objectives can be achieved and an electrode joint of increased strength and lower resistance can be made by using a tapered connecting pin with a taper angle substantially greater than that which has been considered standard up until now. We have found that a pin taper angle between about 15 degrees and about 35 degrees works well with 20 degrees to 30 degrees preferred.

The drawings illustrate the apparatus used in the examples to demonstrate the improvement in electrode joint porperties using the wide taper angle according to the invention.

FIG. One illustrates a two dimensional model of a central section of a plastic electrode joint being subjected to tension and bending forces prior to being photographed under polarized light.

FIG. Two illustrates a three dimensional plastic model of an electrode joint being subjected to tension and bending forces while in an oven prior to being sliced for samples to be examined under polarized light.

FIG. Three illustrates an electrical test device for measuring resistance across an electrode joint.

FIG. Four illustrates a test machine set-up for measuring the flexured force necessary to break an electrode joint.

In FIG. One is illustrated the taper angle $\theta$ formed by the center line 17 of the electrode connecting pin model 13 and the taper line 19 of the thread crests 21 of the electrode connecting pin model 13.

The improved strength of joints according to the invention was demonstrated using plastic models and photoelasticity tests. The techniques of photoelasticity are well established in the field of experimental stress analysis. Utilizing the principles of photoelasticity, an extensive experimental study was made of both two-dimensional and three-dimensional models of electrode joints subjected to tensile and bending loads in order to study the effects of the geometric parameters of the joint on the location and magnitude of the peak stresses in the joints. In the photoelastic method, a two-dimensional plastic model of uniform thickness which is under stress, or a slice of three-dimensional plastic model which had previously been subjected to stress while it was heated, is viewed in a polariscope, where it is placed between crossed sheets of polarized material. The stresses in the model, when viewed in the polarized light of the polariscope, give rise to an interference pattern, usually called a fringe pattern. In analyzing the fringe pattern, a number can be assigned to each fringe, and it is possible to assign a fringe value to any point on the model, usually to within ±0.02 fringe. According to photoelastic theory, the fringe value at any point is directly proportional to the difference in the principal stresses at that point. At those points in our models where the stresses were highest, which were always at an edge of the model, the principal stress normal to the model edge was zero so that the fringe values were directly proportional to the stresses. Therefore, in some of our experiments, it was possible to give relative values of stress in terms of fringe values. In our experiments, stresses were measured in two-dimensional models while they were under load; and stresses were measured in three-dimensional models after they were subjected to loads by utilizing the stress-freezing technique. These experiments are described below in Examples I and II.

EXAMPLE I

Experiments were performed with three different two-dimensional plastic models of joints in which the only variable was the taper angle. The two electrode parts of the models, made of ⅛ inch thick polyester plastic, (PSM-1, manufactured by Photolastic, Inc. of Malvern, Pa.) were four inches wide and 6.5 inches long. The connecting pins, made of the same plastic, had major diameters of 2.9 inches and lengths of 3.6 inches. There were four threads per inch, as measured parallel to the electrode axis, and the threads all were of a conventional design, with flat faces and an included angle of 60°; the threads were also conventionally symmetric, with the faces making an angle of 30° relative to a line passing through the apex of the thread perpendicular to the electrode axis. The three models had taper angles of 9.46°, 20°, and 30°.

As shown in FIG. 1 the top electrode end 10 of the model was fixed in a support 12 by pins 14 and for the tension tests only a load 16 was suspended by strings 18 from a rod 20 passed through a hole in the bottom electrode end 11 of the model. The top end of the model 10 was connected to the bottom end of the model 11 by the connecting pin of the model 13 and the two ends of the model touched each other at the end faces 15 when no tension load 16 was applied. The load 16 amounted to 15.8 pounds. The bending test involved using only a load 22 suspended by strings 24 over a pulley 26 from the rod 20. This arrangement exerted a bend force on the electrode end 11 of the model in the direction of the arrow 28. The bending load 22 was 3.75 pounds. In both tests the weight loaded models were observed under polarized light and measurements of fringe value were made at three locations in the top electrode where the stress was greatest: (1) at the base of the socket (point A of FIG. 1), (2) at the unengaged thread of the socket (point B of FIG. 1), and (3) at the first active thread of the socket (point C of FIG. 1). The fringe values always decreased in going to successive active threads. Table I lists the fringe values and the stresses they represent at the three locations in each model. It can be seen that the stress is highest at the first active thread, next highest at the unengaged thread, and third highest at the base of the socket. The numbers clearly show that the maximum fringe value (maximum stress) for both tension and bending loads decreases as the taper angle increases.

TABLE I

| Test No. | Taper Angle | Base of Socket F.V.* | Base of Socket Stress** | Unengaged Thread F.V.* | Unengaged Thread Stress** | First Active Thread F.V.* | First Active Thread Stress** |
|---|---|---|---|---|---|---|---|
| 1 | 9.46 | 2.5 | 800 | 3.3 | 1060 | 3.6 | 1150 |
| 2 | 20° | 1.4 | 450 | 2.3 | 740 | 2.5 | 800 |
| 3 | 30° | 1.0 | 320 | 1.6 | 510 | 2.2 | 700 |
| 4 | 9.46 | 1.1 | 350 | 1.6 | 510 | 2.0 | 640 |
| 5 | 20° | 0.4 | 120 | 1.1 | 350 | 1.4 | 450 |
| 6 | 30° | 0.5 | 160 | 0.6 | 190 | 1.0 | 320 |

*Fringe Value
**Stress in pounds per square inch
Tests 1, 2 and 3 were in tension
Tests 4, 5 and 6 were with a bending force

EXAMPLE II

Figure 2:
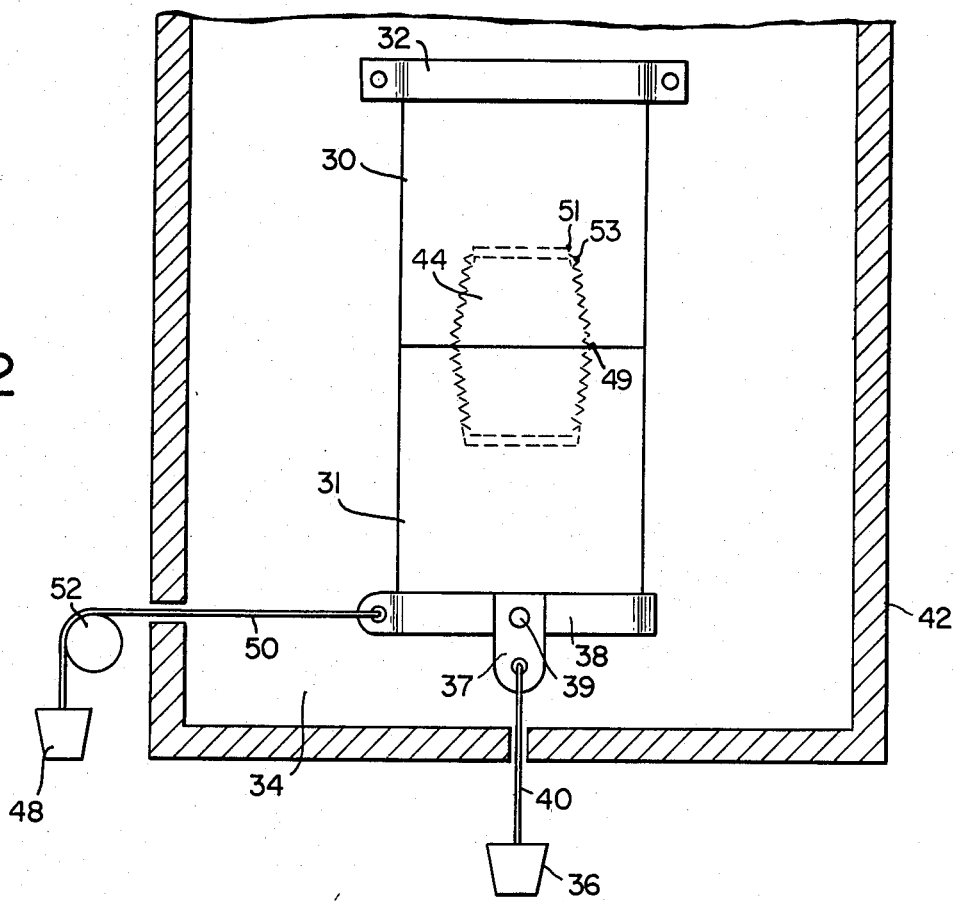

In these experiments three dimensional cast epoxy resin one-sixth scale models of the 24 inch diameter electrode joints comprising different size pins and different thread tapers were subjected to tension and to bending loads while in an oven. The epoxy resins PLM-4B manufactured by Photolastic, Inc. of Malvern, Pa. The test apparatus is shown in FIG. 2. The top electrode section 30 and the bottom electrode section 31 were each 4 inches in diameter and 7 inches long. The top electrode section 30 after three dimensional scale model electrode joint was supported by a clamp 32 inside an oven 34.

In the tension tests employing the stress-freezing technique a load 36 pounds was suspended from tension load 37 by a rod 40 passing through oven wall 42. The tension load clamp 37 was received to the bottom electrode section 31 by steel pin 39. The combined weight of the tension load clamp 37, steel pin 39, rod 40 and load 36 was 8.75 pounds. The oven was then heated to a temperature of 250° F., at which temperature the epoxy resin was relatively soft, and was then cooled at a slow rate of approximately 1° per hour back to room temperature. Once cooled, the entire electrodes joint, consisting of top electrodes section 30, bottom electrodes section 31 and connecting pin 44, was removed from the oven and without disassembly two vertical cuts were made through the model to obtain a 0.2 inch thick slice encompassing its central axis of the model. The polished slices were examined in a polariscope and the fringe patterns were observed and measured.

For the bending tests the tension load clamp 37 was not employed. Instead a bending load clamp 38 was secured around the bottom of the bottom electrode section 31. A load 48 of 6.12 pounds was attached to bending load clamp by wire 50 running through oven wall 42 over pulley 52. The oven was heated and cooled as in the tension tests and 0.2 inch thick slices of the model were taken as before. The center of each slice was the radial plane of the model which included the vector of the bending movement exherted by wire 50. The polished slices were examined in a polariscope and the fringe patterns were observed and measured.

Table II shows the results obtained with three dimensional models of four types of joints. Both tensile and bending loads were used in order to determine, by simple subtraction of the effect of the tensile load due to the weight of the model material, the stresses due to bending only. The stress $\sigma$ at every point of high stress concentration in the electrode is proportional to the bending moment M at that point, where M is the product of the applied load and the distance from the point of the line of action of the applied load. In the fourth column of Table II, the ratio $\sigma/M$ is given for each model at three points of high stress concentration: (1) the location called "Pin" is a point 49 in the center of the slice on the major diameter of the pin, (2) the location called "Base of Socket" is a point 51 in the center of the slice at the inner surface of the electrode socket where the diameter is a minimum and (3) the location called "First Active Thread" is a point 53 in the center of the slice, that thread in the electrode socket which is in contact with the first thread at the end of the connecting pin.

Since the ratio $\sigma/M$ is the stress per applied bending moment, the value of $\sigma/M$ can serve as an indicator of failure of the joint. If the electrode material and pin material have the same strength, failure will most likely take place at the location where $\sigma/M$ is greatest. However, electrode material and pin material usually have different strengths. Assuming that the ratio of pin strength to electrode strength is 1.6 which is based on typical strength values, there has been calculated for the pin an "Adjusted $\sigma/M$" which is the value of $\sigma/M$ in the fourth column divided by 1.6; these values of adjusted $\sigma/M$, along with the unchanged values of $\sigma/M$ for the electrode, are shown in the fifth column of Table II. There is then shown, in the last column of Table II, the relative order of joint failure of the four joints and the location of the failure crack; the criterion used to predict joint breakage is that a failure crack will most likely initiate where the adjusted $\sigma/M$ value is highest.

Of the four joints, the first joint to fail would be the one with the smaller (12½×14) connecting pin and the conventional 9.46° taper angle, and failure would occur at the first active thread in the electrode socket. The second joint to fail would be the one with the larger (13½×18) connecting pin and the 9.46° taper angle, and failure would also occur at the first active thread in the electrode socket. The third and fourth joints to fail would be the ones with the smaller and larger connecting pins with the 20° taper angle and these joints would fail through the pin. Table II indicates that increasing the taper angle leads to greatly reduced stress in the electrode socket and slightly increased stress at the center of the pin, the net effect being to increase the strength of the joint. The best way to practice the invention is to adjust the length and diameter of the connecting pin and the taper angle, taking account of the actual relative strengths of the electrode and pin materials, in such a way that the joint will fail with equal probability (the same value of adjusted $\sigma/M$) in the pin and at the first active thread of the electrode socket. For example, the data in Table II indicate that the strongest joint is the one with the 13½×18 connecting pin and the 20° taper angle; in comparing the values of adjusted $\sigma/M$ for the two joints with 13½×18 connecting pins, it would seem that a joint utilizing a taper angle of about 15° would probably have an adjusted $\sigma/M$ of approximately 3.4 at both the pin and first active thread and would, therefore, be just slightly stronger than the joint with the 20° taper angle. For practical reasons, however, a user will prefer a joint which will preferentially break through the pin rather than through the electrode because he can then salvage and reuse the electrode while replacing only the pin. Therefore, after ascertaining the optimum design for the joint by above procedure, it may be desirable to reduce the pin diameter or length slightly or increase the taper angle slightly to weight the probability of failure more toward the pin.

TABLE II

| Connecting Pin* | Taper | Location of Stress Concentration | $\sigma/M$ for Model (psi/ft.lb.) | Order of Adjusted $\sigma/M$ | Relative Joint Failure |
|---|---|---|---|---|---|
| 12½ × 14 | 9.46 | Pin | 5.8 | 3.6 | |
| | | Socket Base | 2.2 | 2.2 | |
| | | First Active Thread | 6.5 | 6.5 | 1 |
| 12½ × 14 | 20° | Pin | 6.6 | 4.1 | 3 |
| | | Socket Base | 2.5 | 2.5 | |
| | | First Active Thread | 2.9 | 2.9 | |
| 13½ × 18 | 9.46 | Pin | 5.1 | 3.2 | |
| | | Socket Base | 2.3 | 2.3 | |
| | | First Active Thread | 4.4 | 4.4 | 2 |
| 13½ × 18 | 20° | Pin | 5.6 | 3.5 | 4 |
| | | Socket Base | 2.1 | 2.1 | |
| | | First Active Thread | 2.4 | 2.4 | |

*Dimensions (maximum diameter × length) in inches for full size 24 inch diameter electrodes of which there are 1/6 scale modules.

EXAMPLE III

Figure 3:
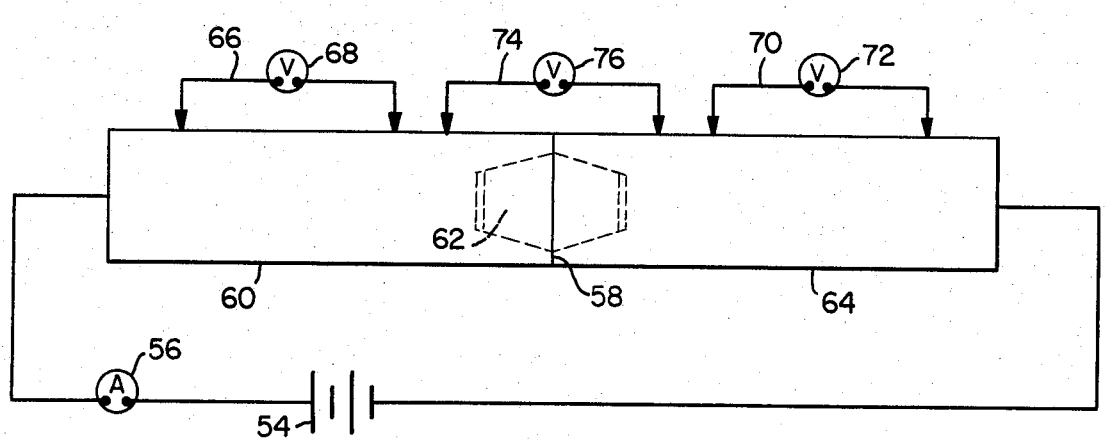

Measurements of joint electrical resistance with connecting pins of varying taper were made with eight inch diameter electrodes joined with 4 13/16 inch maximum diameter by 7 inch long connecting pins. The joints were tightened with a torque wrench to a torque of 140 foot pounds. As shown in FIG. 3 a current from battery 54 measured by ammeter 56 was passed through joint 58 which consisted of a first electrode 60, connecting pin 62 and second electrode 64. Resistance measurements were made in the solid first electrode 60 using probe 66 and voltmeter 68 and in the second electrode 64 using probe 70 and voltmeter 72, and the two measurements were averaged for each electrode joint combination. The ends of the probes 66 and 70 were each set 14 inches apart along the lengths of the two connected electrodes 60 and 64, and with the resistance determined using probe 74 and voltmeter 76 representing the total resistance of the length of electrodes involved (7 inches of each electrode) as well as the added resistance of the joint itself.

Subtracting the average resistance of electrodes 60 and 64 from the total resistance across the joint gives the actual resistance added by the joint itself. In table III are listed for each joint of varying taper angle the average solid resistance of the electrodes, the total resistance of the joint and electrode material and finally the actual resistance of the joint itself. Table III clearly shows that the joint electrical resistance decreased as the taper angle increased.

TABLE III

| | | ($10^{-3}$ ohms) Resistance | | |
|---|---|---|---|---|
| Joint No. | Taper Angle | Solid Electrode Average | Joint Total | Joint Alone |
| 1 | 9.46 | 0.113 | 0.134 | 0.021 |
| 2 | 9.46 | 0.110 | 0.140 | 0.030 |
| 3 | 15 | 0.103 | 0.119 | 0.016 |
| 4 | 15 | 0.127 | 0.143 | 0.016 |
| 5 | 20 | 0.106 | 0.117 | 0.011 |
| 6 | 20 | 0.107 | 0.120 | 0.013 |

EXAMPLE IV

Figure 4:
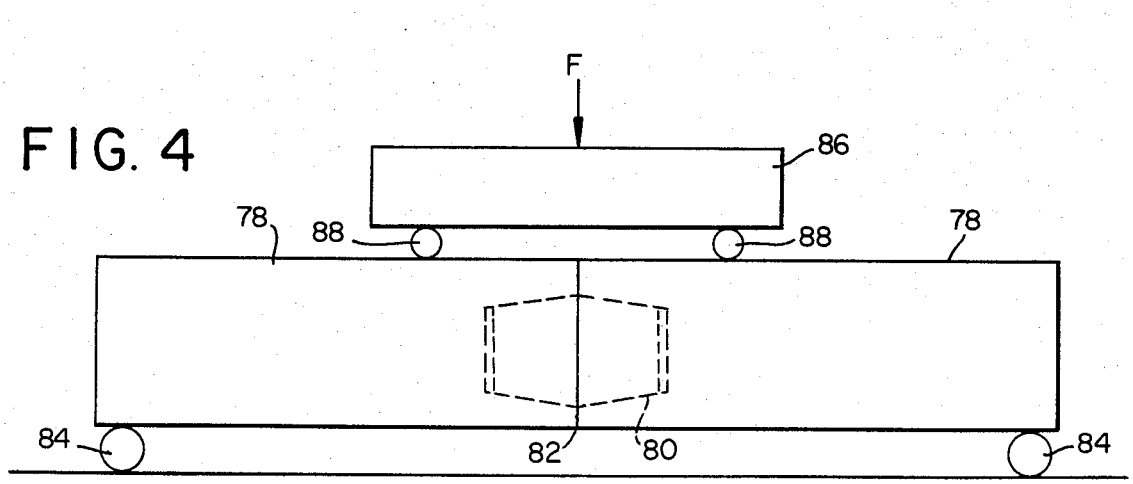

Flexural tests to determine joint strength were made on joints with connecting pins of varying taper. The electrodes were eight inch diameter graphite stock and the connecting pins were 4 13/16 inches in maximum diameter by 7 inches long. The joints were tightened with a torque wrench to a torque of 140 foot pounds. The test apparatus, a Baldwin Universal Testing Machine is shown schematically in FIG. 4. The electrode sections 78 joined by connecting pin 80 at joint 82 were supported on supports 84 spaced 54 inches apart, the joint 82 being centered between the supports 84. Force F was applied to the joint through a steel distributor 86 resting on steel rods 88 spaced 18 inches apart and equidistant from the joint. Using this apparatus a breaking force $F_j$ for joints with connecting pins of varying taper was determined by increasing the force F until the joint broke in flexure. The same apparatus was used to apply force to solid electrodes of the same size made from the same stock to determine the force $F_s$ necessary to break the solid electrode without a joint.

In order to take account of the variation in strength of the different electrodes, the flexural strength $\sigma_j$ of the electrode sections used in the joint strength test was determined for six test bars taken from these electrodes. These bars were one inch square by six inches long with the lengths of the bars parallel to the electrode central axis and were tested on the Baldwin Universal Testing Machine using a set-up similar to that shown in FIG. 4. The distance between the supports for the test bar was five inches while the distance between the load bars on to on top of the test bar was 1.67 inches. Similarly, the flexural strength $\sigma_s$ was determined for bars cut from the solid electrodes which were used for the determination of breaking force $F_s$. The values for breaking force $F_j$ and for flexural strength $\sigma_j$ of the electrode stock used for each joint for various tapers are shown in Table IV.

In order to account for the variation in strength of the electrode stock material, and to thereby normalize the test data a joint strength efficiency has been defined by the formula:

$$\text{Joint Strength Efficiency} = \frac{F_j \times \sigma_s}{\sigma_j F_s} \times 100\%$$

The value of 0.151 in.$^{-2}$ for $\sigma_s/F_s$ was obtained from the average value of $F_s$ measured for the solid electrode sections and from the average value of $\sigma_s$ for the bars taken from these solid electrode sections. The joint strength efficiency is therefore a dimensionless number, expressed as a percentage, which is proportional to the strength of the joint. A joint strength efficiency of 100% (unattainable) would indicate a joint which is as strong as a solid electrode. As can be seen in Table IV the joint strength efficiency increased as the taper angle was increased.

TABLE IV

| Joint No. | Taper Angle Degrees | Joint Breaking Force $F_j$ (lbs.) | Flexural Strength of test bars (psi) | Joint strength efficiency |
|---|---|---|---|---|
| 1 | 9.46 | 3560 | 1450 | 37.1 |
| 2 | 9.46 | 2770 | 1260 | 33.2 |
| 3 | 15 | 3610 | 1200 | 45.5 |
| 4 | 15 | 3550 | 1380 | 38.9 |
| 5 | 20 | 3980 | 1040 | 57.9 |
| 6 | 20 | 3680 | 1360 | 40.9 |

What is claimed is:

1. A connecting pin for joining two graphite electrode sections, said pin being tapered and threaded on both ends, the angle of said taper from the centerline of said pin being between about 15° and about 35°.

2. A connecting pin according to claim 1 wherein said angle is between about 20° and about 30°.

3. A connecting pin according to claim 1 wherein said angle is about 20°.

4. A connecting pin according to claim 1 wherein said angle is about 30°.

5. A graphite electrode column joint comprising two graphite electrode ends having axial tapered threaded end sockets and a double ended tapered threaded connecting pin screwed into both of said sockets, the angle of said taper from the centerline of said pin being between about 15° to about 35°.

6. A graphite electrode column joint according to claim 5 wherein said angle is between about 20° and about 30°.

7. A graphite electrode column joint according claim 5 wherein said angle is about 20°.

8. A graphite electrode column joint according to claim 5 wherein said angle is about 30°.

* * * * *